United States Patent Office 3,302,197
Patented Jan. 31, 1967

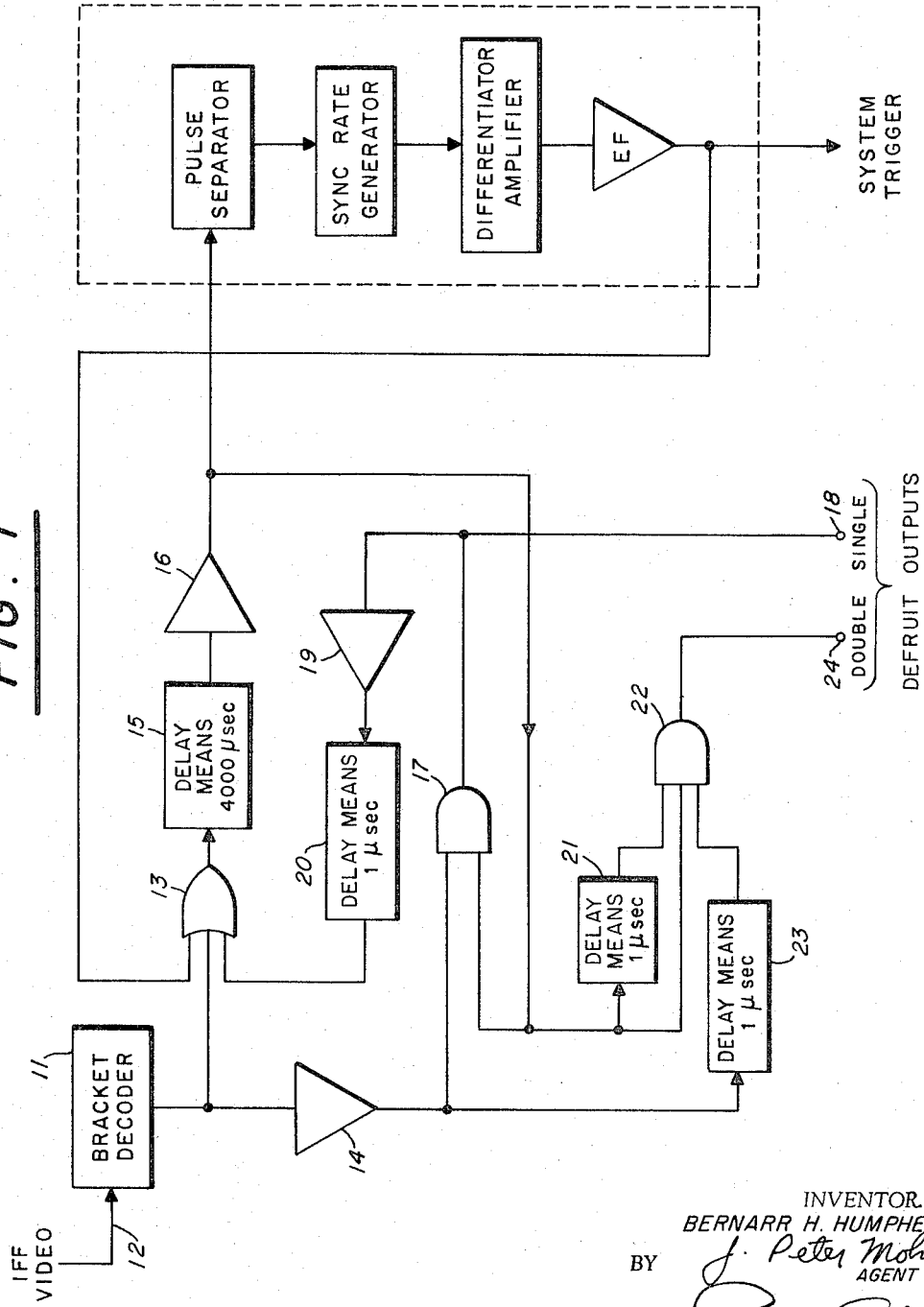

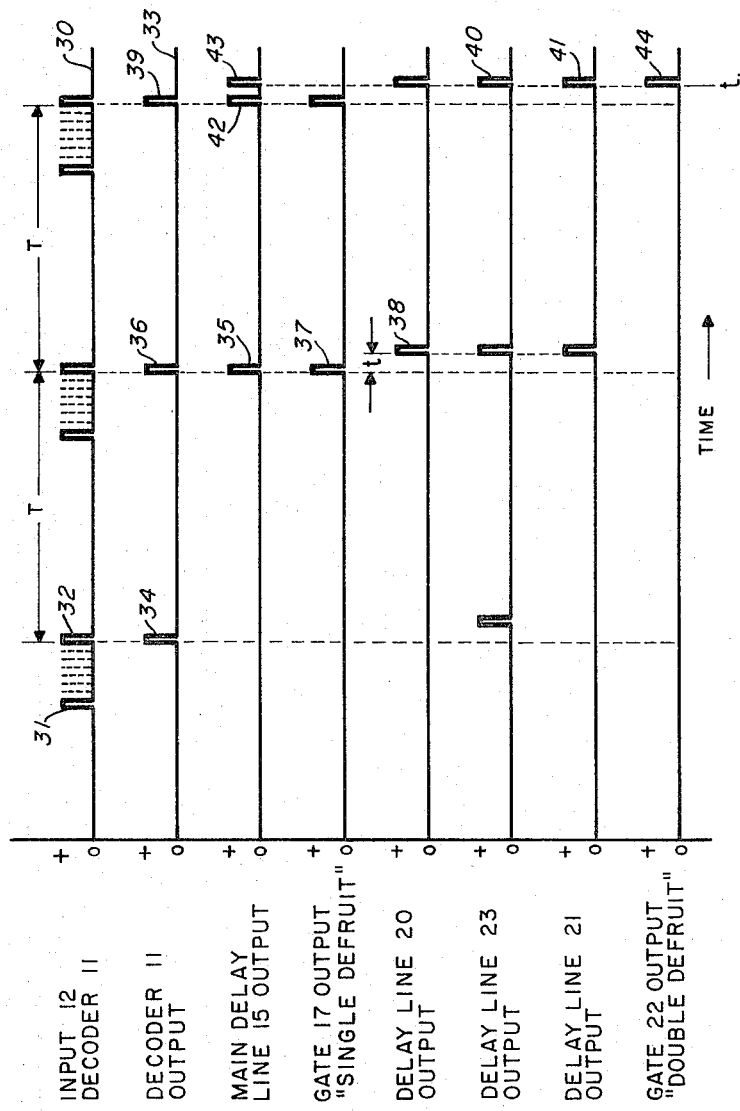

3,302,197
SINGLE DELAY LINE DOUBLE DEFRUITER
Bernarr H. Humpherys, Escondido, Calif., assignor to the United States of America as represented by the Secretary of the Navy
Filed July 27, 1966, Ser. No. 568,358
5 Claims. (Cl. 343—6.5)

The invention described herein may be manufactured and used by or for the Government of the United States of America for governmental purposes without the payment of any royalties thereon or therefor.

This invention relates to an improved IFF system defruiter and more particularly to an IFF system defruiter which provides a double defruit output while utilizing a single delay line.

U.S. Patent No. 3,182,310, issued on May 4, 1965 to Bernarr H. Humpherys, describes a system for rejecting non-synchronous replies of IFF radar in a relatively simple and straightforward manner. Such non-synchronous replies have acquired the title of "fruit" in the art and consequently those devices designed to eliminate such replies have been called defruiters. The defruiter described in the above mentioned patent utilizes bracket decoded pulses from an IFF system rather than entire IFF video signals as in the prior art. The pulses from a bracket decoder are indicative of the receipt of an IFF video signal which has a start and a stop pulse spaced by a proper predetermined time interval. Consequently, the bracket decoder produces a serial pulse output, each of the pulses of the series being representative of the receipt of a start and a stop pulse from an IFF video signal. The 1965 Humpherys' patent utilizes a delay line for delaying the output from a bracket decoder by an interval equal to the repetition time of an associated IFF system. Delayed pulses are then compared with succeeding non-delayed pulses and when coincidence is detected between the two a defruit output is produced.

The coincidence or defruit output resulting from a single delay line and a single coincidence detector is commonly referred to as single defruit. Although the single defruiting operation is quite effective in removing the non-synchronous replies or fruit, it is still possible that some fruit may go undetected. To further improve the system, additional stages of defruiting may be cascaded with the first stage. For example, in the 1965 Humpherys' patent the drawing shows a modification wherein another stage consisting of second delay line and a second coincidence device may be serially connected with the first stage for improved results. The output from the second stage is commonly referred to as double defruit. A primary disadvantage of the use of a double defruiter is the fact that it necessitates a second delay line and consequently a substantial increase in cost. Since the delay periods necessary are on the order of 4,000 microseconds suitable delay lines are of the magnetostrictive type. Such lines are relatively expensive and consequently the use of two in one device results in a substantial cost increase.

An object of this invention therefore is to provide a defruiter capable of a double defruit operation which does not necessitate the use of two magnetostrictive delay lines.

Another object of this invention is to provide a system for accurately detecting time synchronism between a plurality of serial pulse signals.

Another object of this invention is to provide an inexpensive double defruiter for use in an IFF radar system.

A more particular object of this invention is to provide a double defruiter for IFF video replies which utilizes a single magnetostrictive delay line.

In accordance with this invention an input is provided for receiving serial pulses for which time synchronism is to be detected. In the case of an IFF system the serial pulses are the output from a bracket decoder. A first delay means is then provided for receiving the serial pulses and producing output pulses representative of the received pulses but delayed by a time preiod T. A first coincidence detecting means is then arranged to detect coincidence between pulses from said source of same and output pulses from the first delay means. When coincidence is detected between those pulses a first coincidence output signal is produced. The first coincidence output is then delayed an additional time $t$ by first incremental delay means and supplied once again to the input of said first delay means. The time period $t$ is substantially shorter than the period T. Second and third incremental delay means each having a delay time of $t$ are arranged to delay pulses from said first delay means and those from said source of serial pulses respectively. Finally a second coincidence means is provided for detecting coincidence between pulses from said second and third incremental delay means and output pulses from said first delay means. When coincidence of those three signals occurs the second coincidence detecting means is responsive thereto for producing a second coincidence output pulse. Such a second coincidence output pulse is indicative of equal time spacing T between respective ones of a series of three pulses from the source of serial pulses. The second coincidence output is therefore a double defruit signal in the language of the IFF art.

The above objects and features of this invention will be better understood from the following detailed description and drawings wherein:

FIG. 1 is a block diagram of one embodiment of the invention;

FIG. 2 is an idealized graph of representative signals present in the embodiment of FIG. 1.

The embodiment shown in FIG. 1 is directed in particular to operation with an IFF radar system. As an exemplary figure, for easy understanding, it is assumed that the IFF system has a repetition time of approximately 4,000 microseconds and consequently the delay lines used have delay times related to such a repetition time. It should be understood that the invention is not limited to use with an IFF system but could be adapted to operate in any other system where a determination of time synchronism of serial pulses was desirous.

Referring now to FIG. 1, the input 12 of a bracket decoder 11 is provided with IFF video signals. As previously stated, a bracket decoder is a device which produces a single output pulse when a pair of input pulses having proper spacing, are received. In particular, bracket decoder 11 is responsive to receipt of a start and a stop pulse having proper time spacing. The output of decoder 11 is supplied to one input of an OR gate 13 and simultaneously to a buffer amplifier 14. Delay means 15 is the main delay device in the invention. It receives output signals from the OR gate 13 and delays them by a time period T. The period T is chosen to approximately equal the repetition time of the associated radar system. In this instance therefore, T equals 4,000 microseconds. For effecting a time delay of 4,000 microseconds, it has been found that magnetostrictive delay lines are the most suitable devices presently available and consequently delay means 15 is preferably a delay line of such type.

Delayed signals from delay means 15 are supplied to a driver amplifier 16 where they are amplified for use in the remainder of the system. The output of amplifier 16 is connected to one input of a first coincidence detecting means, to wit AND gate 17. The other input of AND gate 17 receives signals from amplifier 14. Gate 17 operates in the conventional manner and consequently produces an output when a signal is present at both of its inputs. The output of AND gate 17 is representative of a single defruiting action and consequently may be connected to a single defruit output terminal 18. The output of gate 17 is also connected to a driver amplifier 19. Amplifier 19 is arranged to drive a first incremental delay means 20. There are three such incremental delay means used in the embodiment shown and each is substantially identical in construction and operation. The incremental delay means must be operative to delay a pulse input by a time interval $t$ which in the instant example is on the order of one microsecond. With delay times short as one microsecond, delay lines of the lumped constant variety are suitable for use as each of the incremental delay means in the system. The output of delay means 20 is therefore equal to the output of amplifier 19 delayed by one microsecond. The delayed output is supplied to OR gate 13 at another of its inputs.

The second of the incremental delay means is connected to receive the output of driver amplifier 16. It delays signals from amplifier 16 by an interval on the order of one microsecond and supplies the delayed signals to a first input of the second coincidence detecting means or AND gate 22. A second input of gate 22 receives the output of amplifier 16 without any delay being introduced. Finally the third input of gate 22 is supplied with output pulses from bracket decoder 11 which have been delayed by passing through the third incremental delay means 23.

When a signal is present on each of the inputs of gate 22, the gate functions in the conventional manner and produces an output. As will be better understood from the ensuing description of the operation of the invention it is that output which indicates that the last three pulses from the bracket decoder were spaced by equal time periods, to wit, 4,000 microseconds. A signal at the output of gate 22 is therefore a double defruit indication, in terms of the IFF language. Consequently, the output of gate 22 is connected to a double defruit output terminal 24 for subsequent connection to readout equipment such as a PPI scope.

The components enclosed by the dotted line in FIG. 1 are not essential to the instant invention but are merely exemplary of a suitable manner of synchronizing the instant invention with an associated radar system. The method of synchronization shown in FIG. 1 is identical to that described in the previously mentioned Humpherys' Patent No. 3,182,310. Some form of synchronization is necessary to insure that the delay period introduced by the defruiter is the same as the repetition time of the associated radar system.

All of the components used in the instant invention, such as the gates and amplifiers, are of conventional design and hence a detailed description of the operation is not considered necessary.

OPERATION

The idealized waveforms shown in the graphs of FIG. 2 have been included to simplify the understanding of the operation of a specific embodiment of the invention. The IFF video replies which are presented to the decoder 11 are depicted on line 30 of the graph. It can be noted that each reply consists of a first, or start, pulse such as 31 and a last, or stop, pulse such as 32. Between the start and stop pulses the video information is contained as indicated by the dotted lines. If the replies being received are synchronous, then each group of pulses will be spaced from other groups by a time interval T. As shown on line 33 the bracket decoder responds to the video pulse groups by producing a single output pulse when a start and stop pulse of proper spacing have been received. The defruiting operation is then conducted using solely the output pulses from the bracket decoder and not any of the actual video information pulses.

Under normal operation then, the first bracket decoder output pulse 34 passes through the OR gate 13 and into the main delay line 15. After an interval T, which represents the delay period of the delay line, pulse 34 reaches the end of the delay line 15 as shown by pulse 35 in FIG. 2. If the next video reply group is in synchronism with the first, simultaneous with the arrival of the pulse 35 at the end of the delay line decoder 11 will have produced a new or second output such as pulse 36. Since both of these pulses 35 and 36 are applied to respective inputs on the AND gate 17 and since they occur in time coincidence, AND gate 17 will produce an output pulse as shown at 37 in the graph. Pulse 37 is the single defruit output. Pulse 37 is then delayed by an additional microsecond in the delay line 20 and recycles through the OR gate 13 and the main delay line 15. At this time then two pulses will be traveling through the main delay means, to wit, the last bracket decode output pulse 36 and, spaced behind it by interval $t$, the incrementally-delayed single defruit pulse 37 which has been designated in its delayed version as pulse 38. The system is now prepared to produce a double defruit indication as will be described.

At time $t_1$ various things have occurred in the system. Firstly, the spaced pair of pulses traveling down the main delay line 15 have exited from said delay line. Furthermore, a third bracket decode output pulse 39 has been produced. The pulse 39 has been delayed by one microsecond after passing through delay line 23 and consequently a pulse 40 indicative of the delayed bracket decode output is present at one input of the AND gate 22. Simultaneously the two other inputs of the AND gate 22 will have signals present. A first of the other signals present at gate 22 will be pulse 41, representative of pulse 42 incrementally delayed by delay line 21. The second of the other pulses at gate 22 is pulse 43 which represents the first defruit output which has been delayed by the 4,000-microsecond period plus a microsecond. Since all three inputs of gate 22 receive signals simultaneously, the gate will produce an output or double defruit signal. The system has therefore indicated that the last three video groups were in time synchronism.

From the above description it may be noted that in essence what has been done is that the single main delay line has taken the place of two delay lines by utilizing time division multiplexing techniques. It should be further noted that in the example described above the three IFF reply groups were assumed to be in time synchronism. If such synchronism had not been present, the double defruit output would not have been produced and the non-synchronous information would not have been supplied to the eventual read-out device.

From the above description, it should be apparent that this invention obviates the prior necessity of utilizing two costly magnetostrictive delay lines to perform a double defruiting operation but achieves the same result by using only a single magnetostrictive line.

Although the invention has been shown and described in terms of one particular embodiment it should not be limited thereto for various changes could be made by one skilled in the art without departing from the spirit and scope of the invention as defined in the following claims.

What is claimed is:

1. A system for detecting time synchronism between a plurality of serial pulse signals when said pulses are spaced by predetermined time periods T comprising:
 a source of serial pulses,
 first delay means for receiving pulses and producing output pulses representative of said received pulses delayed by said time period T,
 means for supplying pulses from said source to said first delay means,
 first coincidence detecting means for detecting coincidence between pulses from said source and output pulses from said first delay means and responsive to such coincidence for producing a first coincidence output signal, first incremental delay means for delaying said first coincidence output by a time period $t$ and supplying said delayed coincidence output to said first delay means, said time period $t$ being substantially shorter than said period T, second incremental delay means for delaying output pulses from said first delay means by said time period $t$, third incremental delay means for delaying pulses from said source of regular receiving pulses by said period $t$, second coincidence detecting means for detecting coincidence between pulses from said second and third incremental delay means and output pulses from said first delay means and responsive to coincidence for producing a second coincidence output pulse, said second coincidence output being indicative of equal time spacing T between the last three pulses from said source.

2. The system of claim 1 wherein:
said source of serial pulses is a bracket decoder of an IFF radar system, and
said time period T equals the repetition time of said radar system.

3. The system of claim 1 wherein said first delay means is a magnetostrictive delay line.

4. The system of claim 2 wherein:
T is on the order of 4,000 microseconds, and $t$ is on the order of 1 microsecond.

5. The system of claim 3 wherein said first, second and third incremental delay means are delay lines of the lumped constant type.

References Cited by the Examiner
UNITED STATES PATENTS
3,182,310   5/1965   Humpherys _____ 343—6.5

RODNEY D. BENNETT, *Acting Primary Examiner.*

D. C. KAUFMAN, *Assistant Examiner.*